(12) United States Patent
Oberle

(10) Patent No.: US 7,859,415 B2
(45) Date of Patent: Dec. 28, 2010

(54) RFID BASED IDENTIFICATION DEVICE

(75) Inventor: Robert R. Oberle, Macungie, PA (US)

(73) Assignee: RCD Technology Inc., Quakertown, PA (US)

( * ) Notice: Subject to any disclaimer, the term of this patent is extended or adjusted under 35 U.S.C. 154(b) by 327 days.

(21) Appl. No.: 12/131,782

(22) Filed: Jun. 2, 2008

(65) Prior Publication Data

US 2009/0128295 A1    May 21, 2009

Related U.S. Application Data

(60) Provisional application No. 60/988,652, filed on Nov. 16, 2007.

(51) Int. Cl.
*G08B 13/14* (2006.01)
(52) U.S. Cl. .............. 340/572.7; 340/572.8; 340/572.4; 340/572.5
(58) Field of Classification Search ... 340/572.1–572.8, 340/10.1; 343/731, 735, 788, 793, 803, 808, 343/895, 700 MS
See application file for complete search history.

(56) References Cited

U.S. PATENT DOCUMENTS

| 5,776,278 | A | * | 7/1998 | Tuttle et al. .................. 156/213 |
| 7,420,512 | B2 | * | 9/2008 | Lannon et al. ........ 343/700 MS |
| 2006/0066441 | A1 | | 3/2006 | Knadle, Jr. et al. |
| 2006/0202835 | A1 | * | 9/2006 | Thibault .................. 340/573.1 |
| 2007/0057797 | A1 | | 3/2007 | Waldner et al. |
| 2007/0090954 | A1 | | 4/2007 | Mahaffey |

OTHER PUBLICATIONS

International Search Report for PCT/US08/81468, dated Jan. 6, 2009, 8 pages.

* cited by examiner

*Primary Examiner*—Anh V La
(74) *Attorney, Agent, or Firm*—Fliesler Meyer LLP

(57) ABSTRACT

A RFID-based identification device comprising a first RFID antenna; and a second RFID antenna, wherein the first and second RFID antennas are in a first arrangement, the resonant frequencies of the antennas are away from an interrogation frequency such that no identification information is transferred, and wherein when the first and second RFID antennas are in a second arrangement, the resonant frequency of the identification device shifts such that identification information is transferred.

14 Claims, 3 Drawing Sheets maintaining an RFID-based identification device such that the first and second antennas are in a first arrangement with the resonant frequency of the antennas array from an identification frequency such that no identification information is transferred

adjusting an RFID-based identification device such that the first and second antennas are in a second arrangement wherein the resonant frequency of the RFID-based illustration device is shifted such that identification information is transferred

FIGURE 2

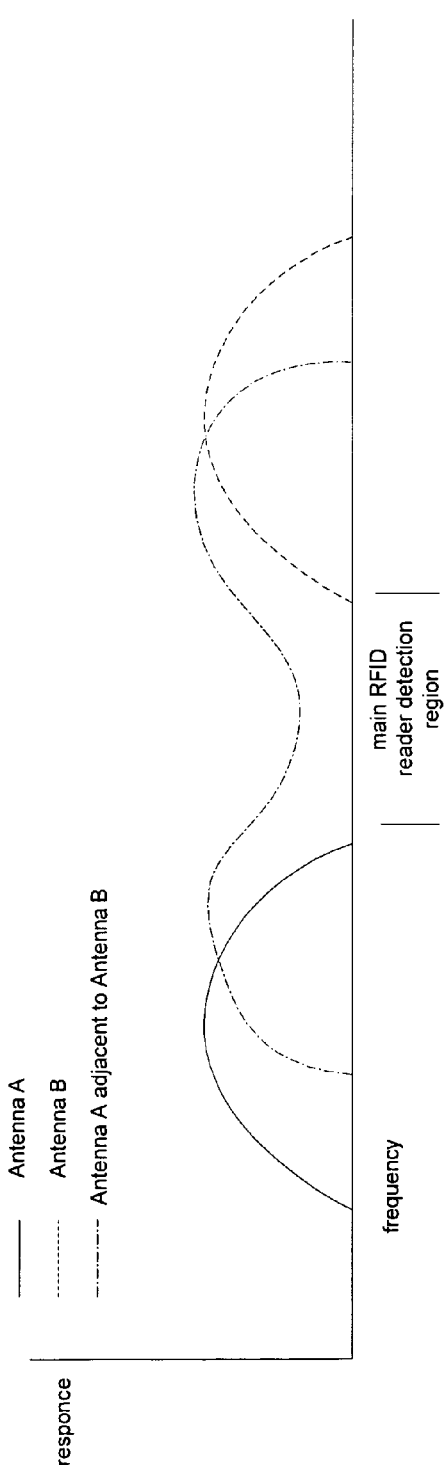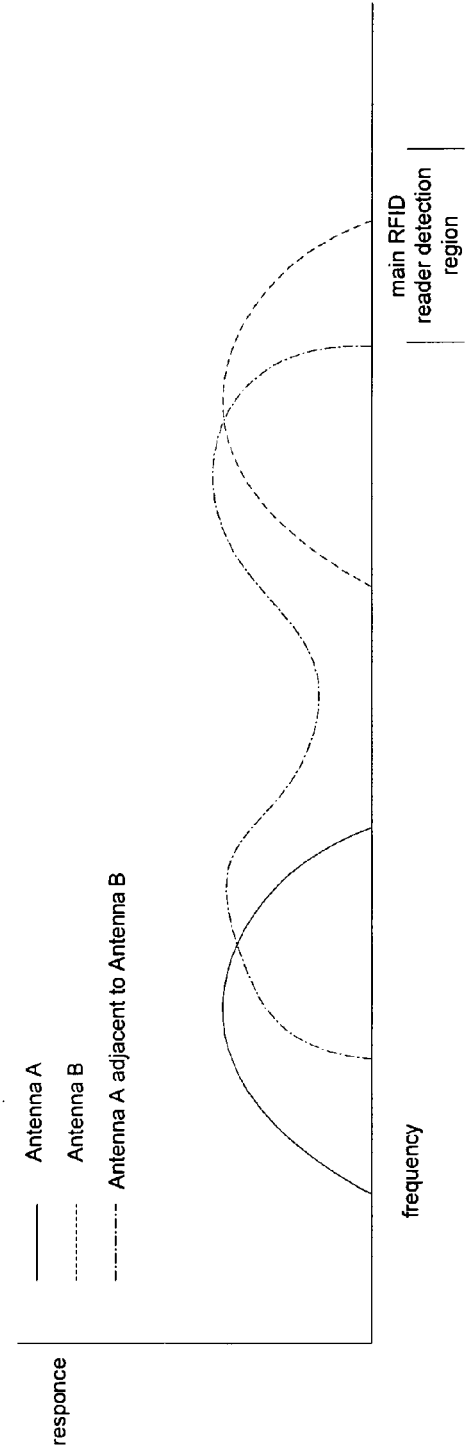

RFID BASED IDENTIFICATION DEVICE

CLAIM OF PRIORITY

This application claims priority to U.S. Provisional Application No. 60/988,652 entitled "RFID BASED IDENTIFICATION DEVICE" filed Nov. 16, 2007, which is incorporated herein by reference.

BACKGROUND OF INVENTION

The present invention relates to the use of a Radio Frequency ID (RFID) system.

BRIEF DESCRIPTION OF THE DRAWINGS

FIG. 2 shows a method of one embodiment.

FIGS. 3A and 3B are diagrams showing the operation of one embodiment.

DETAILED DESCRIPTION

Embodiments of the present invention use the fact that adjacent RFID antennas can affect one another to provide security in a RFID device.

In one embodiment, in the normal position, the data from the RFID identification device can not be read. In another position of the identification device, the data can be read because of the change in the positioning of the RFID antennas.

The RFID-based identification device can be a wallet, a passport, an ID tag or the like.

One embodiment of the present invention is a RFID-based identification device 102, a first RFID antenna 104; and a second RFID antenna 106. When the first and second RFID antennas are in a first arrangement such as that shown in FIG. 1A, the resonant frequencies of the antennas can be away from an interrogation frequency so that no identification information is transferred. When the first and second RFID antennas are in a second arrangement, such as shown in FIG. 1B, the resonant frequency of the identification device shifts such that identification information is transferred.

Figure 1B:
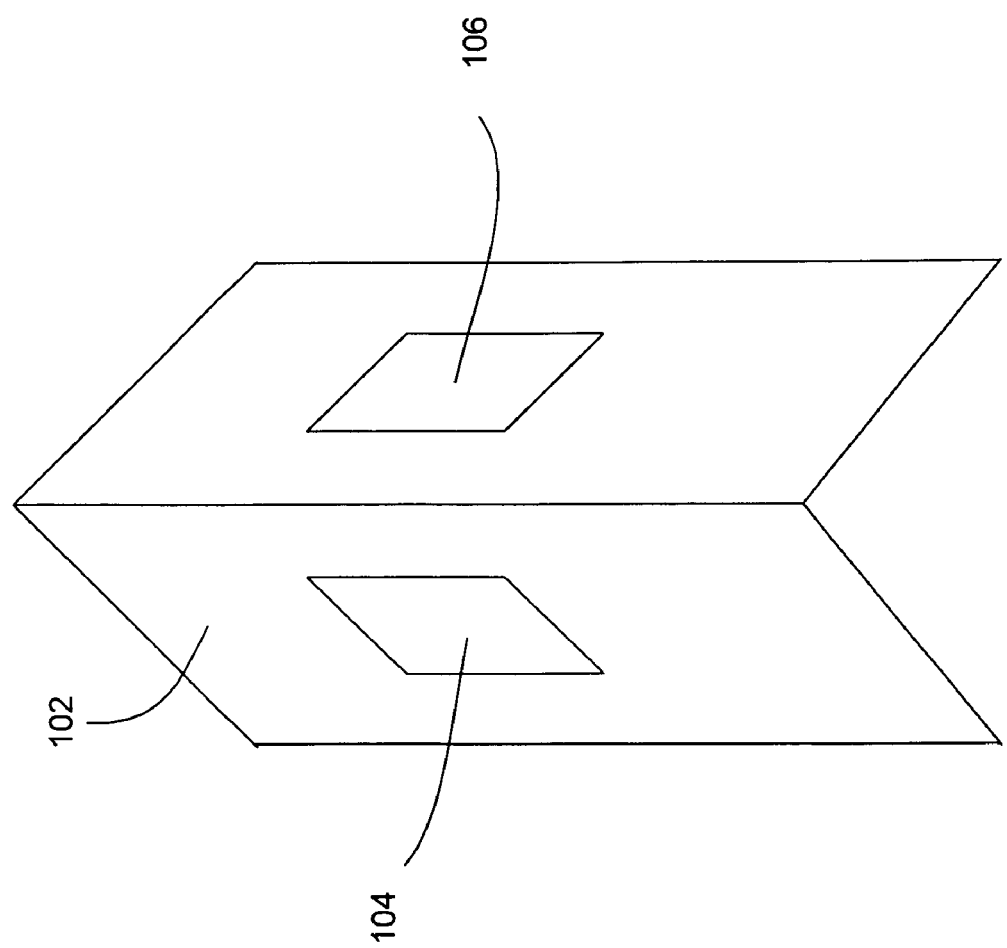
FIGS. 1A and 1B show an RFID identification device of one embodiment.
Figure 1A:
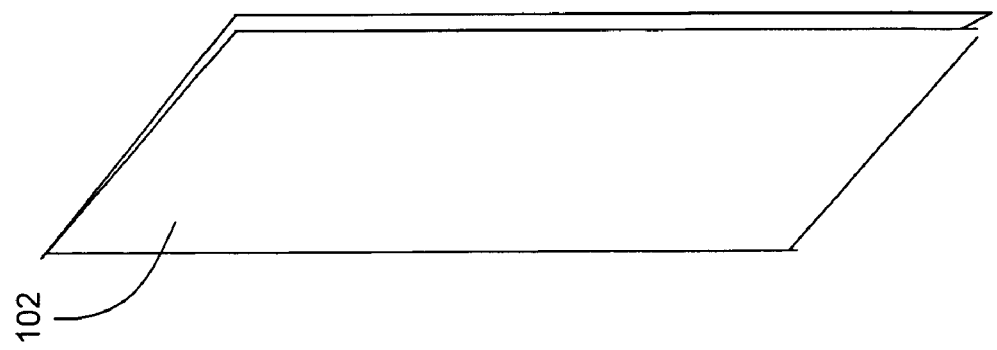

FIG. 1A shows the first arrangement with RFID antennas adjacent and FIG. 1B shows the second arrangement with the RFID antennas apart.

Alternately, the first arrangement can have the RFID antennas apart and the second arrangement has the RFID antennas adjacent.

In one embodiment, the RFID-based identification device can fold, like a passport, between the first and second arrangement.

The first and second antennas can be operably connected. In one embodiment, the antennas are operably connected using a material such as the pages of a booklet. Alternately, the first and second antennas can be on different elements that are not connected.

In one embodiment, a portion of the RFID identification information is stored associated with the first antenna and a portion of the RFID identification information is stored associated with the second antenna.

One embodiment is a method comprising in step 202, maintaining an RFID-based identification device such that the first and second antennas are in a first arrangement with the resonant frequency of the antennas away from an identification frequency such that no identification information is transferred. In step 204, the RFID-based identification device is adjusted, such that the first and second antennas are in a second arrangement wherein the resonant frequency of the RFID-based illustration device is shifted such that identification information is transferred.

In one embodiment, the response characteristics are shifted such that the RFID response within antenna frequency detection range. FIGS. 3A and 3B show hypothetical examples where the adjacent positioning of the RFID antennas causes a shift in response frequency.

The foregoing description of preferred embodiments of the present invention has been provided for the purposes of illustration and description. It is not intended to be exhaustive or to limit the invention to the precise forms disclosed. Many embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the claims and their equivalents.

The invention claimed is:

1. A RFID-based identification device comprising:
   a first RFID antenna; and
   a second RFID antenna, wherein the first and second RFID antennas are in a first arrangement, the resonant frequencies of the antennas are away from an interrogation frequency such that no identification information is transferred, and wherein when the first and second RFID antennas are in a second arrangement, the resonant frequency of the identification device shifts such that identification information is transferred.

2. The RFID-based identification device of claim 1, wherein the first arrangement has the RFID antennas apart and the second arrangement has the RFID antennas adjacent.

3. The RFID-based identification device of claim 1, wherein the first arrangement has the RFID antennas adjacent and the second arrangement has the RFID antennas apart.

4. The RFID-based identification device of claim 1, wherein the RFID-based identification device folds between the first and second arrangement.

5. The RFID-based identification device of claim 1, wherein the first and second antenna are connected.

6. The RFID-based identification device of claim 1, wherein the first and second antennas are on different elements that are not connected.

7. The RFID-based identification device of claim 1, wherein a portion of the RFID identification information is stored associated with the first antenna and a portion of the RFID identification information is stored associated with the second antenna.

8. A method comprising:
   maintaining an RFID-based identification device such that the first and second antennas are in a first arrangement with the resonant frequency of the antennas array from an identification frequency such that no identification information is transferred, and
   adjusting the RFID-based identification device such that the first and second antennas are in a second arrangement wherein the resonant frequency of the RFID-based illustration device is shifted such that identification information is transferred.

9. The method of claim 8, wherein the first arrangement has the RFID antennas apart and the second arrangement has the RFID antennas adjacent.

10. The method of claim 8, wherein the first arrangement has the RFID antennas adjacent and the second arrangement has the RFID antennas apart.

11. The method of claim 8, wherein the RFID-based identification device folds between the first and second arrangement.

12. The method of claim 8, wherein the first and second antenna are connected.

13. The method of claim 8, wherein the first and second antennas are on different elements that are not connected.

14. The method of claim 8, wherein a portion of the RFID identification information is stored associated with the first antenna and a portion of the RFID identification information is stored associated with the second antenna.

* * * * *